(12) United States Patent
Marechal et al.

(10) Patent No.: US 6,318,737 B1
(45) Date of Patent: Nov. 20, 2001

(54) ROLL CONTROL ACTUATOR

(75) Inventors: Michel Marechal, Meriel; Guillaume Dazin, Montmorency, both of (FR)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/578,331

(22) Filed: May 25, 2000

(30) Foreign Application Priority Data

Jun. 4, 1999 (GB) .................................................. 9912899

(51) Int. Cl.$^7$ ................................................ B60G 21/055
(52) U.S. Cl. ................................ 280/5.511; 280/124.106; 267/277
(58) Field of Search ............................ 280/5.506, 5.508, 280/5.511, 124.106, 124.107, 124.112, 124.149, 124.152; 267/188, 191, 277

(56) References Cited

U.S. PATENT DOCUMENTS

| | | | |
|---|---|---|---|
| 4,648,620 | * 3/1987 | Nuss | 280/124.106 |
| 5,217,245 | * 6/1993 | Guy | 280/5.511 |
| 5,251,926 | * 10/1993 | Aulerich et al. | 267/188 |
| 5,417,407 | * 5/1995 | Gordon | 267/277 |
| 5,573,265 | * 11/1996 | Pradel et al. | 267/277 |
| 5,749,596 | * 5/1998 | Jensen et al. | |
| 5,882,017 | * 3/1999 | Carleer | 267/191 |
| 6,022,030 | * 2/2000 | Fehring | 280/124.106 |
| 6,149,166 | * 11/2000 | Struss et al. | 280/124.106 |
| 6,190,260 | * 2/2001 | Flores et al. | |

FOREIGN PATENT DOCUMENTS 2212770 8/1989 (GB) .
2220625 1/1990 (GB) .

* cited by examiner

Primary Examiner—J. J. Swann
Assistant Examiner—Christopher Bottorff
(74) Attorney, Agent, or Firm—Robert M. Sigler

(57) ABSTRACT

A roll control actuator (34) for installation between first and second axially aligned parts (14,16) of a torsion bar comprises a first cylindrical housing (36) connectable at one end (38) to the first part of the torsion bar and having a cylindrical wall (44) with an inner surface (68) and a second cylindrical housing (40) connectable at one end (42) to the second part of the torsion bar and having a cylindrical wall (46) with an inner surface (50,72). The cylindrical wall of the first housing is coaxial with, rotatable relative to, and axially fixed relative to, the cylindrical wall of the second housing. A shaft (62) positioned inside the first and second housings is capable of moving in the axial direction relative to the first and second housings. A first tripot joint (76) is mounted on the shaft and has rollers (80) positioned in helically extending grooves (70) formed in the inner surface of the cylindrical wall of the first housing. A second tripot joint (76) is mounted on the shaft and has rollers (80) positioned in helically extending grooves (74) formed in the inner surface of the cylindrical wall of the second housing. The grooves in the inner surface of the cylindrical wall of the first housing have an opposite rotational direction about the axis (A) to the grooves in the inner surface of the cylindrical wall of the second housing. Fluid chambers (58,60) are associated with the shaft and the first and second housings to control the relative rotational movement therebetween.

8 Claims, 2 Drawing Sheets

ROLL CONTROL ACTUATOR

TECHNICAL FIELD

This invention relates to a roll control actuator for a roll control system of a motor vehicle.

BACKGROUND OF THE INVENTION

It is known to provide a roll control system for a motor vehicle which comprises a torsion bar which is formed in two parts, with an actuator positioned between the two parts. The actuator is controllably actuated to either allow free relative rotational movement of the two parts of the torsion bar about their longitudinal axes (for example, during straight line motion of the motor vehicle), or to create a torque between (or lock) the two parts together (for example, during cornering of the motor vehicle). Known roll control actuators, as, for example, described in GB-A-2212770 and GB-A-2220625 are complicated.

SUMMARY OF THE INVENTION

It is an object of the present invention to provide a roll control actuator which overcomes the above mentioned disadvantage.

A roll control actuator in accordance with the present invention for installation between first and second axially aligned parts of a torsion bar comprising a first cylindrical housing connectable at one end to the first part of the torsion bar and having a cylindrical wall with an inner surface; a second cylindrical housing connectable at one end to the second part of the torsion bar and having a cylindrical wall with an inner surface; the cylindrical wall of the first housing being coaxial with, rotatable relative to, and axially fixed relative to, the cylindrical wall of the second housing; a shaft positioned inside the first and second housings and being capable of moving in the axial direction relative to the first and second housings; a first tripot joint mounted on the shaft and having rollers positioned in helically extending grooves formed in the inner surface of the cylindrical wall of the first housing; a second tripot joint mounted on the shaft and having rollers positioned in helically extending grooves formed in the inner surface of the cylindrical wall of the second housing; the grooves in the inner surface of the cylindrical wall of the first housing having an opposite rotational direction about the axis to the grooves in the inner surface of the cylindrical wall of the second housing; and control means associated with the shaft and the first and second housings to control the relative rotational movement therebetween.

The roll control actuator in accordance with the present invention is much simpler, and hence easier to assembly, then previously known actuators.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
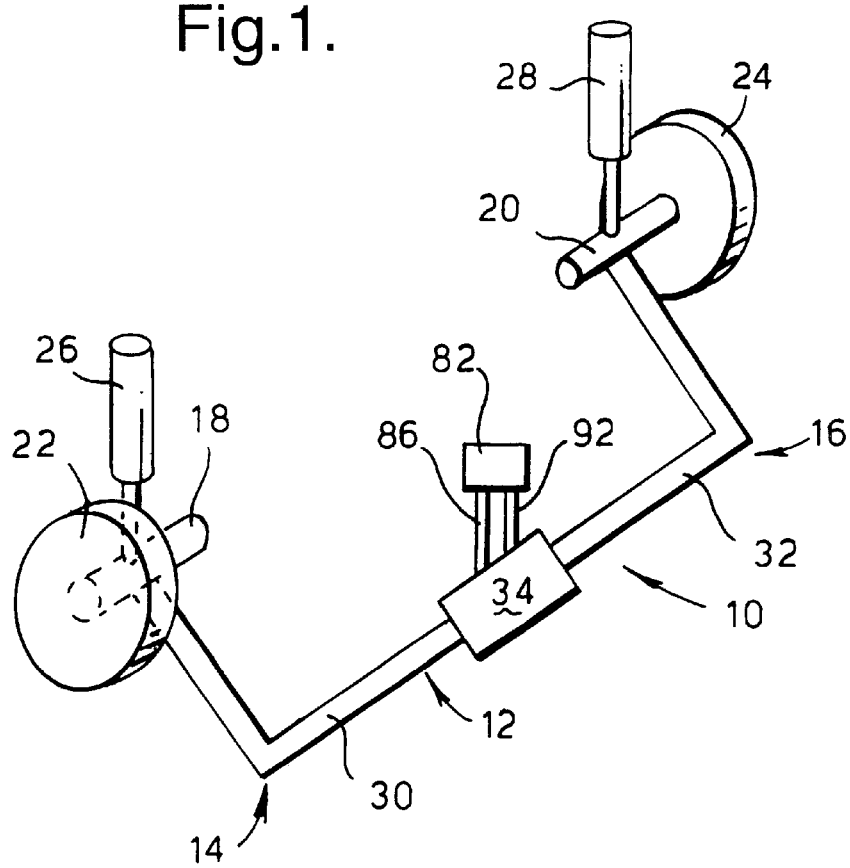
FIG. 1 is a schematic presentation of a roll control system of a motor vehicle including a roll control actuator in accordance with the present invention.
Figure 3:
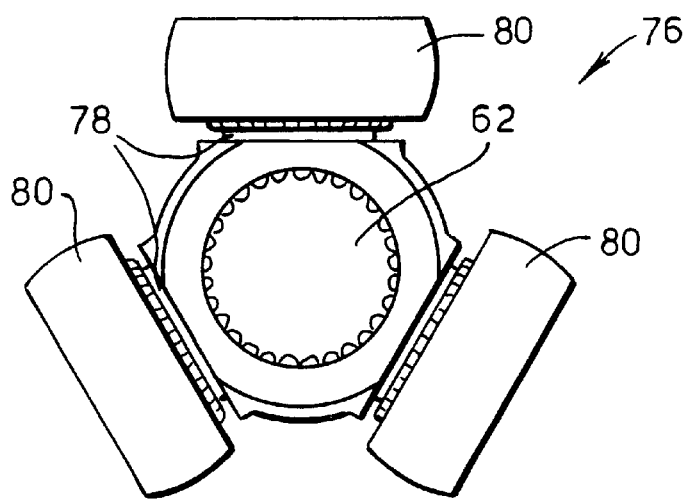
FIG. 3 is an end view of the shaft and one of the tripot joints used in the roll control actuator of FIG. 2.

Referring to FIG. 1 of the drawings, the roll control system 10 comprises a torsion bar 12 which is split into first and second parts 14,16, respectively. Each end of the torsion bar 12 is connected to a wheel axle 18, 20 on which a wheel 22, 24 is rotatably mounted. The wheel axles 18, 20 are attached to the vehicle body (not shown) by way of suspension units 26, 28. The first and second parts 14,16 of the torsion bar 12 have portions 30, 32, respectively, which are axially aligned. The axially aligned portions 30, 32 are connected by a roll control actuator 34.

Figure 2:
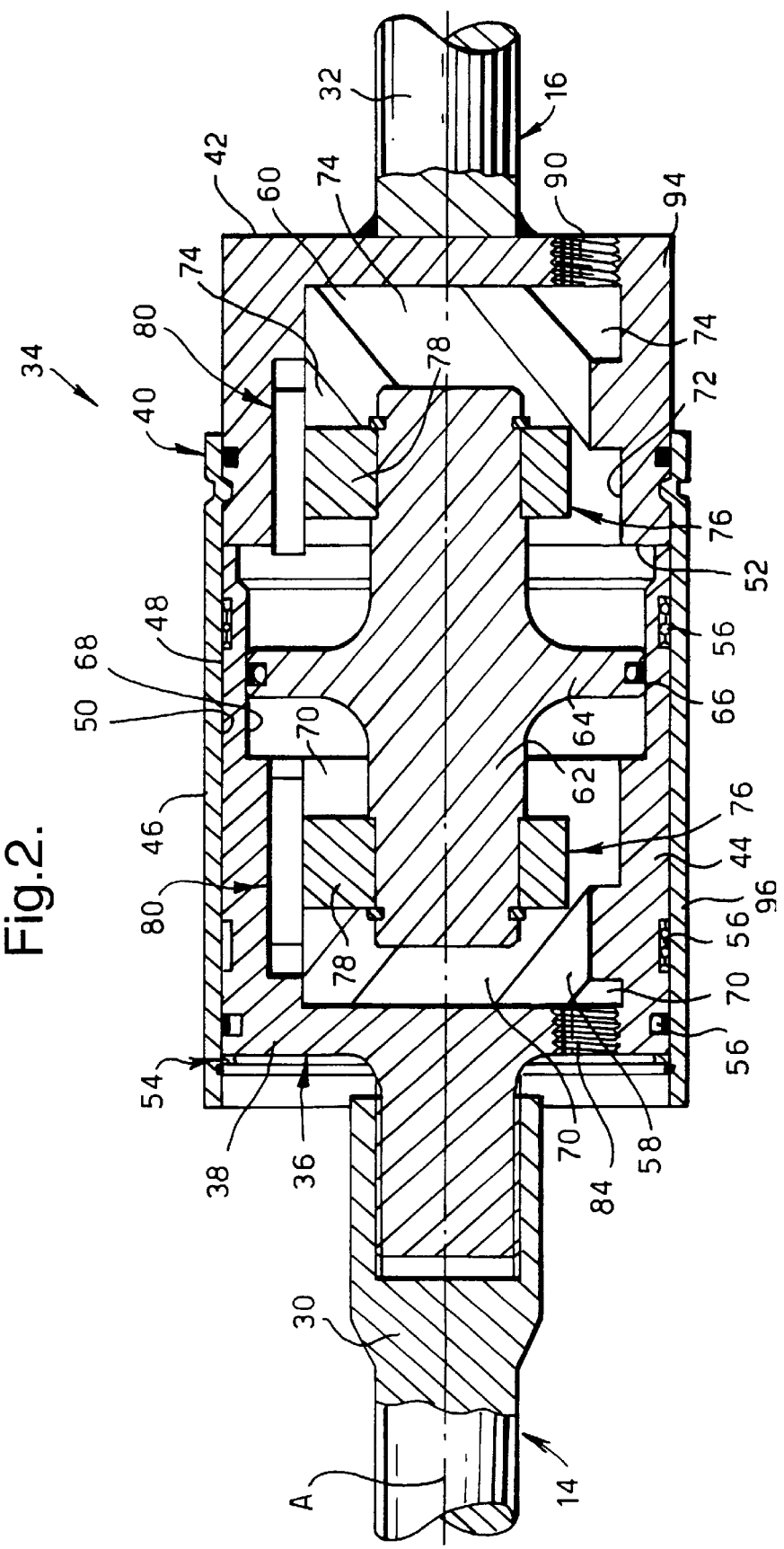
FIG. 2 is a cross-sectional view of the roll control actuator of FIG. 1.

The roll control actuator 34, as shown in FIG. 2, comprises a first cylindrical housing 36 connected at one end 38 to the portion 30 of the first part 14 of the torsion bar 12. The actuator 34 further comprises a second cylindrical housing 40 connected at one end 42 to the portion 32 of the second part 16 of the torsion bar 12. The first housing 36 has a cylindrical wall 44 which is coaxial with the axis A of the first and second parts 14 of the torsion bar 12. The second housing 40 has a cylindrical wall 46 which is coaxial with the axis A.

The cylindrical wall 44 of the first housing 36 is positioned inside the cylindrical wall 46 of the second housing 40 such that the outer surface 48 of the cylindrical wall 44 of the first housing 36 makes a tight sliding fit with the inner surface 50 of the cylindrical wall 46 of the second housing 40. The cylindrical wall 44 of the first housing 36 engages an internal shoulder 52 formed in the inner surface 50 of the cylindrical wall 46 of the second housing 40. The end wall 38 of the first housing 36 engages a retaining ring 54 secured in the inner surface 50 of the cylindrical wall 46 of the second housing 40. Fluid seals 56 are positioned between the outer surface 48 of the cylindrical wall 44 of the first housing 36 and the inner surface 50 of the cylindrical wall 46 of the second housing 40. The arrangement is such that the first housing 36 can rotate about axis A relative to the second housing 40, but that the first housing is substantially prevented from moving in an axial direction relative to the second housing. As a consequence, only relative rotational movement, about axis A, is possible between the first and second parts 14,16 of the torsion bar 12.

The first housing 36 defines a first fluid chamber 58. The second housing 40 defines a second fluid chamber 60. A shaft 62 extends in the axial direction A between the first and second chambers 58,60. The shaft 62 has a radial extension 64 which, at the outer circumferential edge 66, makes a sealing sliding fit with the inner surface 68 of the cylindrical wall 44 of the first housing 36. The shaft 62 and extension 64 are capable of sliding in the axial direction relative to the first and second housings 36,40, and hence define a piston which fluidly separates the first and second fluid chambers 58,60. The inner surface 68 of the cylindrical wall 44 of the first housing 36 has three helically extending grooves 70 formed therein. The portion 72 of the inner surface 50 of the cylindrical wall 46 of the second housing 40 has three substantially identical helically extending grooves 74 formed therein, but leading in the opposite rotational direction, about the axis A, to the grooves 70 in the first housing 36.

A tripot joint 76 is mounted on the shaft 62 in each fluid chamber 58,60. Each tripot joint 76 has three radially extending rods 78 with a roller 80 rotatably mounted on the radially outer end of each rod. Each roller 80 is positioned in one of the grooves 70,74 and is capable of rolling along its respective groove. This arrangement allows the shaft 62 to rotate in a helical direction, about the axis A, relative to each housing 36,40. Further, rotation the shaft 62 about the axis A through an angle α relative to the first or the second housing 36,40 will cause the first housing to rotate through an angle 2α relative to the second housing.

The first fluid chamber 58 is connected to a source of hydraulic pressure, such as a fluid pump 82 by way of inlet 84 in the end wall 38 of the first housing 36 and a pipe 86. The second fluid chamber 60 is connected to the fluid pump 82 by way of an inlet 90 in the end wall 42 of the second housing 40 by a pipe 92. The pump 82 is actuated by an electronic control unit (not shown) which monitors the steering angle of the wheels 22, 24. The first and second fluid chambers 58,60 contain fluid which defines control means which controls the relative rotational movement between the first housing 36 and the second housing 40 as will be explained below.

During straight line driving of the motor vehicle, the pump 82 is not operational, and no fluid pressure is applied to the first or second fluid chambers 58,60. Should the portion 30 of the first part 14 of the torsion bar 12 rotate about the axis A relative to the portion 32 of the second part 16 of the torsion bar, the shaft 62 will freely rotate about axis A relative to the first and second housings 36,40. As no fluid pressure is present in either of the fluid chambers 58,60, the radial extension 64 and shaft 62 are free to slide in the axial direction. As a consequence, the torsion bar 12 will have substantially no effect on the motor vehicle.

During cornering of the motor vehicle, the portion 30 of the first part 14 of the torsion bar 12 will attempt to rotate about the axis A relative to the portion 32 of the second part 16 of the torsion bar. Also, during cornering, the pump 82 is operated, and pressurised fluid is applied to the first fluid chamber 58, or to the second fluid chamber 60, dependent on the direction of cornering. The pressurised fluid acts on the radial extension 64 to drive the radial extension, the shaft 62, and the tripot joints 76, in the axial direction. Axial movement of the tripot joints 76 causes the tripot joints to rotate about the axis A (due to the effect of the rollers 80 sliding in the grooves 70,74) creating a torque within the actuator 34. The torque counteracts the relative rotation between the first and second housings 36,40 due to the cornering manoeuvre. As a consequence, the portion 30 of the first part 14 of the torsion bar 12 will be substantially prevented from rotating about the axis A relative to the portion 32 of the second part 16 of the torsion bar, and the torsion bar will provide an anti-roll effect on the motor vehicle.

The second housing 40 may be formed in one piece, but, as shown in FIG. 2, is preferably formed from a cylindrical end portion 94 with a tubular attachment 96. In this case, the grooves 74 are preferably formed in the end portion 94. In the above described embodiment, the extension 64 slides on the inner surface 68 of the cylindrical wall 44 of the first housing 36. In an alternative arrangement, the extension 64 may slide on the inner surface of the cylindrical wall 46 of the second housing 40. The shaft 62 and the extension 64 may be formed in one piece, or in two pieces which are joined together. Alternative forms of control means may be used besides the pressurised fluid arrangement described above. For example, a solenoid arrangement may be used for controlling axial movement of the shaft, in which case the fluid seals may be omitted, and the extension on the shaft may be omitted. As a further alternative, the pump may be replaced by a piston arrangement, or a by-pass valve arrangement.

What is claimed is:

1. A roll control actuator for installation between first and second axially aligned parts of a torsion bar comprises a first cylindrical housing connectable at one end to the first part of the torsion bar and having a cylindrical wall with an inner surface; a second cylindrical housing connectable at one end to the second part of the torsion bar and having a cylindrical wall with an inner surface; the cylindrical wall of the first housing being coaxial with, rotatable relative to, and axially fixed relative to, the cylindrical wall of the second housing; a shaft positioned inside the first and second housings and being capable of moving in the axial direction relative to the first and second housings; a first tripot joint mounted on the shaft and having rollers positioned in helically extending grooves formed in the inner surface of the cylindrical wall of the first housing; a second tripot joint mounted on the shaft and having rollers positioned in helically extending grooves formed in the inner surface of the cylindrical wall of the second housing; the grooves in the inner surface of the cylindrical wall of the firs t housing having an opposite rotational direction about the axis to the grooves in the inner surface of the cylindrical wall of the second housing; and control means associated with the shaft and the first and second housings to control the relative rotational movement therebetween.

2. A roll control actuator as claimed in claim 1, wherein the first housing is positioned inside the second housing with the outer surface of the cylindrical wall of the first housing making a tight rotationally sliding fit with the inner surface of the cylindrical wall of the second housing.

3. A roll control actuator as claimed in claim 1 or claim 2, wherein the second housing comprises a cylindrical end portion connectable to the second part of the torsion bar, and a tubular portion secured to the end portion and surrounding the cylindrical wall of the first housing.

4. A roll control actuator as claimed in any one of claims 1 to 3, wherein the cylindrical wall of the first housing is axially fixed relative to the cylindrical wall of the second housing between an internal shoulder formed in the inner surface of the cylindrical wall of the second housing and a retaining ring secured to the inner surface of the cylindrical wall of the second housing.

5. A roll control actuator as claimed in any one of claims 1 to 4, wherein the shaft has a radial extension which makes a sliding fit at its outer circumferential edge with the inner surface of the cylindrical wall of the first housing or the second housing.

6. A roll control actuator as claimed in claim 5, wherein the control means comprises fluid acting on either side of the radial extension, the fluid being pressurisable to substantially prevent relative rotational movement between the first housing and the second housing.

7. A roll control actuator as claimed in claim 6, wherein the fluid is held in first and second fluid chambers positioned on either side of the radial extension inside the first and second housings, the radial extension making a sealing fit with the respective inner surface.

8. A roll control actuator as claimed in claim 6 or claim 7, wherein the fluid is pressurised by a pump.

* * * * *